(12) United States Patent
Saika

(10) Patent No.: US 7,958,259 B2
(45) Date of Patent: Jun. 7, 2011

(54) STORAGE CONTROLLER AND METHOD FOR DETERMINING CLIENT APPROPRIATENESS

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 12/099,634

(22) Filed: Apr. 8, 2008

(65) Prior Publication Data

US 2009/0216902 A1 Aug. 27, 2009

(30) Foreign Application Priority Data

Feb. 22, 2008 (JP) .................................. 2008-041924

(51) Int. Cl.
*G06F 15/173* (2006.01)
(52) U.S. Cl. ........................................ 709/240; 709/225
(58) Field of Classification Search .................. 709/225, 709/240
See application file for complete search history.

(56) References Cited

U.S. PATENT DOCUMENTS

| | | | |
|---|---|---|---|
| 6,389,448 B1 * | 5/2002 | Primak et al. .................. 718/105 |
| 6,760,775 B1 * | 7/2004 | Anerousis et al. ............. 709/238 |
| 7,330,908 B2 * | 2/2008 | Jungck ........................... 709/246 |
| 7,409,433 B2 * | 8/2008 | Lowery et al. ................. 709/214 |
| 2003/0007454 A1 * | 1/2003 | Shorey ........................... 370/229 |
| 2003/0056002 A1 * | 3/2003 | Trethewey .................... 709/238 |
| 2003/0101275 A1 * | 5/2003 | Maciel ........................... 709/235 |
| 2004/0103194 A1 * | 5/2004 | Islam et al. .................... 709/225 |
| 2005/0223096 A1 * | 10/2005 | Shinkai ........................... 709/225 |
| 2007/0094147 A1 | 4/2007 | Fukui et al. |
| 2007/0124577 A1 * | 5/2007 | Nielsen et al. ................. 713/151 |
| 2009/0182835 A1 * | 7/2009 | Aviles et al. ................... 709/213 |

FOREIGN PATENT DOCUMENTS

JP 2007-94681 A 4/2007

* cited by examiner

*Primary Examiner* — Patrice L Winder
*Assistant Examiner* — Thomas J Dailey
(74) *Attorney, Agent, or Firm* — Sughrue Mion, PLLC

(57) ABSTRACT

A packet priority level is set for a packet configuring a file access request, and a file importance level is set for a file. A storage controller manages, for each client, the amount of information (total amount) in the packets sent and received for each packet priority level, and the amount of information (total amount) in the access-targeted files for each file importance level. The storage controller computes an assessment value for assessing whether a target client is appropriate or inappropriate based on one or more amounts of information corresponding to the target client and one or more packet priority levels, and one or more amounts of information corresponding to one or more file importance levels respectively corresponding to one or more packet priority levels and the target client, and determines whether the target client is appropriate or inappropriate in accordance with whether or not the computed assessment value conforms to a prescribed condition.

10 Claims, 12 Drawing Sheets

FIG. 6

PRIORITY LEVEL MANAGEMENT TABLE 81

| CLIENT IDENTIFIER | PACKET PRIORITY LEVEL | | | | | | |
|---|---|---|---|---|---|---|---|
| | 0 | | 1 | | .. | 7 | |
| | NUMBER OF PACKETS [$10^3$] | UPDATE DATE/ TIME | NUMBER OF PACKETS [$10^3$] | UPDATE DATE/ TIME | .. | NUMBER OF PACKETS [$10^3$] | UPDATE DATE/ TIME |
| MAC1 | 50 | H20.01.10 15:30:00 | 50 | H20.01.08 00:15:30 | .. | 50 | H19.11.01 09:00:00 |
| MAC2 | 100 | H19.07.20 23:10:00 | 1 | H18.12.01 22:00:00 | .. | 1 | H20.1.10 10:40:00 |
| : | : | : | : | : | .. | : | : |

IMPORTANCE LEVEL MANAGEMENT TABLE 82

| CLIENT IDENTIFIER | FILE IMPORTANCE LEVEL | | | |
|---|---|---|---|---|
| | 0 | 1 | .. | 7 |
| | AMOUNT OF ACCESS DATA [MB] | AMOUNT OF ACCESS DATA [MB] | .. | AMOUNT OF ACCESS DATA [MB] |
| MAC1 | 50 | 50 | .. | 50 |
| MAC2 | 1 | 1 | .. | 100 |
| : | : | : | .. | : |

APPROPRIATE USAGE DETERMINATION RESULT FILE 83

| CLIENT IDENTIFIER | RESULT |
|---|---|
| MAC1 | APPROPRIATE USAGE CLIENT |
| MAC2 | INAPPROPRIATE USAGE CLIENT |
| : | : |

FIG. 9

DEFINITION FILE 84

```
<APPROPRIATE USAGE>
FILE SIZE          USABLE PATHS
SIZE ≥ 100[MB]     PATH-001, PATH-002, PATH-003
SIZE < 100[MB]     PATH-004, PATH-005

<INAPPROPRIATE USAGE>
PATH-006
```

FIG. 10

PACKET/FILE ACCESS RATIO 9

| CLIENT IDENTIFIER | PACKET/FILE ACCESS RATIO | | | | | | | |
|---|---|---|---|---|---|---|---|---|
| PRIORITY LEVEL OR IMPORTANCE LEVEL | 0 | 1 | 2 | 3 | 4 | 5 | 6 | 7 |
| MAC1 | 1 | 1 | 1 | 1 | 1 | 1 | 1 | 1 |
| MAC2 | 100 | 1 | 1 | 1 | 1 | 1 | 1 | 0.01 |
| : | : | : | : | : | : | : | : | : |

FIG. 17

SCREEN FOR NOTIFYING OF CHANGE IN APPROPRIATE
USAGE DETERMINATION RESULT 10

<APPROPRIATE USAGE CLIENT>  <CURRENT CHANGE>

MAC1 ☑
MAC5 ☑ — 103
MAC3 ☐           101
MAC4 ☐
MAC6 ☐
MAC8 ☐
⋮ ⋮

<INAPPROPRIATE USAGE CLIENT>  <CURRENT CHANGE>

MAC7 ☐
MAC2 ☐           102
⋮ ⋮

STORAGE CONTROLLER AND METHOD FOR DETERMINING CLIENT APPROPRIATENESS

CROSS-REFERENCE TO PRIOR APPLICATION

This application relates to and claims the benefit of priority from Japanese Patent Application number 2008-41924, filed on Feb. 22, 2008, the entire disclosure of which is incorporated herein by reference.

BACKGROUND OF THE INVENTION

1. Field of the Invention

The present invention relates to a storage controller for converting a file access request from a client to a block access request, and sending this block access request to a storage device.

2. Description of the Related Art

Generally speaking, a file server is known as a storage controller that converts a file access request from a client to a block access request, and sends this block access request to a storage device, and a NAS (Network Attached Storage) is known as one type of file server (for example, Japanese Patent Laid-open No. 2007-94681). A NAS receives a file unit access request (hereinafter, "file access request") from a client, and sends a block unit access request (hereinafter, "block access request") to a storage device (storage system) in response to this received file access request.

For example, a plurality of paths is established between a storage system and a higher-level device (for example, a host computer). Thus, even if a failure should occur in a certain path, the higher-level device can send an access request to the storage system via a different path, which has not failed, or carry out load balancing by using a plurality of paths to send a plurality of access requests.

However, when a storage controller such as a NAS is the higher-level device of the storage system, the processing for path selection and load balancing cannot always be carried out appropriately. The reasons for this are as described in (A) and (B) below.

(A) To enable a NAS to receive a packet-prioritized file access request from a client, storage system-oriented processing (for example, path selection and load balancing that connects the NAS to the storage system) can be carried out on the basis of the packet priority level. However, since the packet priority level in essence is a value related to processing between the NAS and the client, and is not a value related to processing relative to a storage system, this processing cannot always be carried out appropriately. Further, since a packet priority level is set by a client or the user thereof, there is also the danger of an illicit value being set.

(B) A file importance level can be set for a file. However, if storage system-oriented processing is carried out simply on the basis of the file importance level, a situation could occur in which priority processing is carried out for a block access request based on a file access request from an inappropriate client rather than for a block access request based on a file access request from an appropriate client.

SUMMARY OF THE INVENTION

Accordingly, an object of the present invention is to make it possible for a storage controller to carry out processing for a storage system appropriately as much as possible.

The storage controller is designed to be able to determine whether a target client is appropriate or inappropriate. More specifically, the storage controller manages the amount of information (total amount) in the packets sent and received for each packet priority level for each client, and the amount of information (total amount) in the access-targeted files for each file importance level. The storage controller computes an assessment value for assessing whether a target client is appropriate or inappropriate based on one or more amounts of information corresponding to the target client and one or more packet priority levels, and one or more amounts of information corresponding to one or more file importance levels respectively corresponding to one or more packet priority levels and the target client, and determines whether the target client is appropriate or inappropriate in accordance with whether or not the computed assessment value conforms to a prescribed condition.

BRIEF DESCRIPTION OF THE DRAWINGS

FIG. 6 is a diagram showing an example of a priority management table;

FIG. 7 is a diagram showing an example of an importance management table;

FIG. 8 is a diagram showing an example of an appropriate usage determination result file;

FIG. 9 is a diagram showing an example of a definition file;

FIG. 10 is a diagram showing an example of the result of a packet/file access ratio;

FIG. 17 is a diagram showing an example of a screen for notifying of a change in the appropriate usage determination result.

DESCRIPTION OF THE PREFERRED EMBODIMENTS

Figure 1:
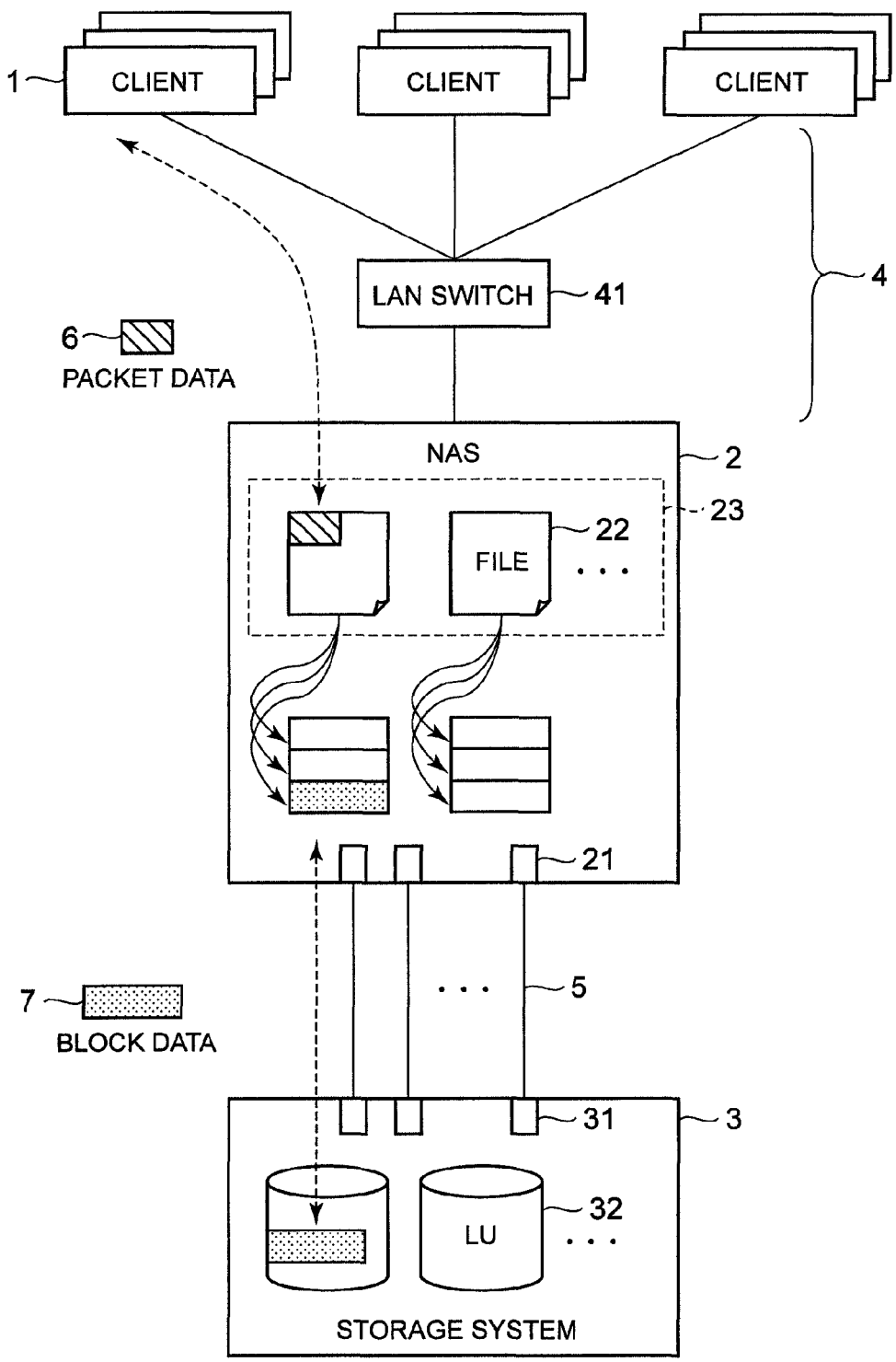
FIG. 1 is a diagram showing an example of the configuration of a computer system related to an embodiment of the present invention.

In Embodiment 1, a storage controller comprises a packet monitoring processor; an access reception module; and a client determination module. When the storage controller receives a packet, the packet monitoring processor updates the amount of information corresponding to both a source client and/or target client of the received packet and the packet priority level set in the received packet, in priority level management information comprising the respective amounts of information corresponding to the respective packet priority levels for each client on the basis of the amount of information in the received packet. The access reception module specifies the file importance level corresponding to an access-targeted file specified by a file access request configured by one or more packets of the plurality of received packets, and on the basis of the amount of information of the access-targeted file, updates the amount of information corresponding to both a source client and/or target client of the access-targeted file and the specified importance level in importance level management information comprising the respective amounts of information corresponding to the respective file importance levels for each client. For each client, the client determination module computes an assessment value for assessing whether a target client is appropriate or inappropriate based on one or more amounts of information corresponding to the target client and one or more packet priority levels, and one or more amounts of information corresponding to one or more file importance levels respectively corresponding to the one or more packet priority levels and the target client, and determines whether the target client is appropriate or inappropriate in accordance with whether or not the computed assessment value conforms to a prescribed condition.

In Embodiment 2 according to Embodiment 1, the storage controller further comprises an access controller. If the source client and/or target client is/are determined to be appropriate, the access controller processes one or more block access requests corresponding to a file access specifying the access-targeted file at a higher priority level than when the source client and/or target client is/are determined to be inappropriate.

In Embodiment 3 according to Embodiment 2, a plurality of paths is established between the storage controller and the storage device. Processing the one or more block access requests at a high priority level signifies sending an access request in the one or more block units via more numerous first paths of the plurality of paths and/or a path with a faster transmission rate of the plurality of paths.

In Embodiment 4 according to Embodiment 3, when the source client and/or target client is/are determined to be appropriate and the size of the access-targeted file is larger than a prescribed size, the access controller sends an access request in the one or more block units via more numerous second paths of the more numerous first paths and/or a path with a faster transmission rate of the more numerous first paths than when the size of the access-targeted file is smaller than the prescribed size.

In Embodiment 5 according to any of Embodiments 1 through 4, the storage controller further comprises a notification module. The notification module notifies a client that is determined to be inappropriate, of an appropriate packet priority level that differs from a packet priority level set in the packet received from this client.

In Embodiment 6 according to Embodiment 5, the configured file access request is a file read request specifying a read-targeted file. The client that has been determined to be inappropriate is the target client of the read-targeted file. The notification module is the packet monitoring processor. The packet monitoring processor notifies the appropriate packet priority level by setting, in the packet to be sent to the target client in response to the file read request, a packet priority level that is lower than the packet priority level set in the packet configuring the file read request, and sending the packet for which this lower packet priority level has been set to the target client.

In Embodiment 7 according to any of Embodiments 1 through 6, if the result of the current determination differs from the result of the previous determination for a certain client of the plurality of clients, the client determination module notifies the computer used by an administrator and/or the certain client of the fact that the result of the current determination differs from the result of the previous determination for the certain client.

In Embodiment 8 according to any of Embodiments 1 through 7, the assessment value is the difference between the amount of information corresponding to the target client and a certain packet priority level, and the amount of information corresponding to a file importance level corresponding to the certain packet priority level and the target client. The prescribed condition is that the difference be less than a prescribed value.

In Embodiment 9 according to any of Embodiments 1 through 7, the assessment value is the difference between a packet mean value corresponding to the target client and a file mean value corresponding to the target client. The prescribed condition is that the difference be less than a prescribed value. The packet mean value is the value of a weighted average using the packet priority level as the data and the amount of information as the weight. The file mean value is the value of a weighted average using the file importance level as the data and the amount of information as the weight.

In Embodiment 10 according to any of Embodiments 1 through 7, the client determination module computes, for the respective priority levels and the respective file importance levels corresponding to the respective packet priority levels, the value of a ratio between the amount of information corresponding to the packet priority level and the amount of information corresponding to the file importance level. The assessment value is the variance of the values of the plurality of computed ratios. The prescribed condition is that the variance be less than a prescribed value.

In Embodiment 11 according to any of Embodiments 1 through 10, the client determination module determines whether the target client is appropriate or inappropriate based on the degree of conformance between a plurality of types of assessment values and a plurality of types of prescribed conditions respectively corresponding to the plurality of types of assessment values.

At least one of the above-described packet monitoring processor, access reception module, client determination module, and access controller can be constructed using hardware, a computer program or a combination thereof (for example, one part can be realized by a computer program, and the remainder can be realized via hardware). The computer program is executed by being read into a prescribed processor. Further, a storage region that exists in a hardware resource, like a memory, can be used as needed for information processing which is carried out by the computer program being read into the processor. Further, the computer program can be installed in a computer from a CD-ROM or other such recording medium, and can also be downloaded to the computer via a communication network.

An embodiment of the present invention will be explained in detail below while referring to the figures. Furthermore, in the explanation of this embodiment, whenever a computer program is the subject of a sentence, this will signify that the processing is actually being carried out by the CPU that executes this computer program.

FIG. 1 is a diagram showing an example of the configuration of a computer system related to this embodiment.

One or more clients 1 and a NAS 2 are interconnected via a communication network 4. A variety of communication networks (for example, a LAN (Local Area Network)) can be employed as the communication network 4. When a LAN is used as the communication network 4, the client 1 and NAS 2, for example, are connected via a LAN switch 41.

The NAS 2 and a storage system 3 are interconnected. A leased line (for example, a FC (Fibre Channel) mode-based data communications-enabled FC cable) 5 can be utilized in connecting the NAS 2 and storage system 3. For example, as shown in FIG. 1, one port 21 of the NAS 2 and one port 31 of the storage system 3 are connected one-to-one via the leased line 5. When ports 21 and 31 are connected on a one-to-one basis like this, the channel linking these ports 21, 31 constitutes one path connecting the NAS 2 and the storage system 3. Then, a plurality of paths are created by connecting each of the plurality of ports 21 comprising the NAS 2 on a one-to-one basis with any of the ports 31 comprising the storage system 3. Furthermore, the NAS 2 and the storage system 3 can be connected by way of a communication network (for example, a SAN (Storage Area Network) or the like). When a communication network is employed, a plurality of paths is formed by a plurality of the respective ports 21, 31 of the NAS 2 and the storage system 3 being connected to the communication network.

The client 1 is a computer that accesses a shared area 23 for files 22 provided by the NAS 2 (hereinafter, "file sharing area"). The client 1, for example, sends to the NAS 2 a file read request requesting that the file 22 in the file sharing area 23 be read out, or a file write request requesting that either a new file 22 be written to the file sharing area 23 or a file 22 in the file sharing area 23 be overwritten. Furthermore, in this embodiment, a file read request and a file write request are generically called a "file access request." A file read request comprises a read command which comprises information showing a read indication and information for specifying a read-targeted file 22. The client 1 receives the read-targeted file 22 as the response from the NAS 2 to the sent file read request. The file write request comprises a write-targeted file 22 in addition to a write command which comprises information showing a write indication and information for specifying a write-targeted file 22. When a LAN is employed as the communication network 4 as in this embodiment, a file access request and other such data flowing over the communication network 4 is divided up and sent as packet data 6 of a prescribed size.

The NAS 2 is a computer for providing the file sharing area 23 to the client 1, and for managing a file 22 written to the file sharing area 23. The NAS 2 comprises a file system (for example, NFS (Network File System) or CIFS (Common Internet File System)) or file sharing program 26 as the computer program for realizing file sharing among clients 1 in the file sharing area 23. One example of the internal configuration of the NAS 2 will be explained in detail hereinbelow by referring to FIG. 2.

The file sharing area 23 that the NAS 2 provides to the client 1 has a storage area (LU (Logical Unit) 32) provided by the storage system 3 allocated thereto. That is, a file 22 written into the file sharing area 23 is actually stored in the storage system 3—provided LU 32. Then, the storage of the data in the LU 32 is carried out in data units of a prescribed size called block data 7. Thus, the NAS 2 manages the corresponding relationship between the file 22 in the file sharing area 23 and the one or more block data 7 that configures this file 22 (the address in the LU 32 in which the block data 7 is stored (hereinafter, the "block address")). Then, the NAS 2, upon receiving a file 22 unit access request (file access request), realizes the access to the file 22 by sending the storage system 3 a block data 7 unit access request (block access request) corresponding to the received file access request. Furthermore, the block access request corresponding to the file access request is an access request to block data 7 that configures the file 22 specified by the file access request. When the file access request is a file read request, the block access request constitutes a request to read out the block data 7 configuring the read-targeted file 22 (hereinafter, "block read request"). The block read request comprises a read command comprising information showing a read indication and the block address and so forth of the read-targeted block data 7. Conversely, when the file access request is a file write request, the block access request constitutes a request to write the block data 7 configuring the write-targeted file 22 (hereinafter, a "block write request"). The block write request comprises a write command which comprises information showing a write indication and the block address and so forth of the write-targeted block data 7, and the write-targeted block data 7.

The storage system 3, for example, can be constituted as a RAID (Redundant Arrays of Independent (or Inexpensive) Disks) system comprising a large number of storage devices (for example, hard disk drives (HDD)) arranged in an array. The storage devices are not limited to HDD, and the RAID system can be configured from other types of storage devices (for example, flash memory drives), and can be a mixture of a plurality of types of storage devices. One example of the internal configuration of the storage system 3 will be explained in detail below by referring to FIG. 3.

The LAN switch 41 is a device for transferring received packet data 6. The LAN switch 41 acquires information showing the destination (for example, destination MAC (Media Access Control) address) from the received packet data 6. Then, the LAN switch 41 references an address table, and transfers the received packet data 6 to the piece of equipment having the acquired MAC address.

Figure 2:
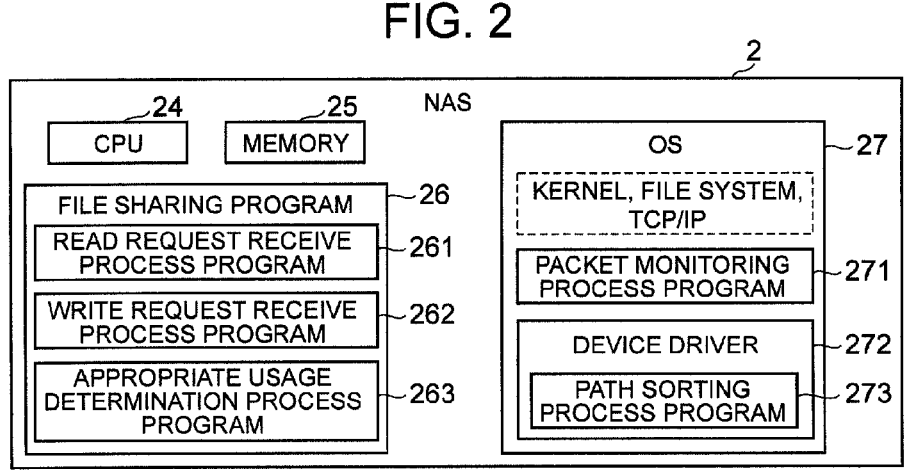
FIG. 2 is a diagram showing an example of the internal configuration of a NAS.

FIG. 2 is a diagram showing an example of the internal configuration of the NAS 2.

The NAS 2, for example, comprises a CPU 24; memory 25; file sharing program 26; and OS 27. The CPU 24 is an arithmetic processing unit for executing various types of programs stored in the memory 25. The memory 25 is a so-called internal storage device. When the file sharing program 26, OS 27 or other such program is executed, these programs are loaded into the memory 25. Further, the memory 25 also stores various information to be utilized when the respective types of programs are executed (for example, a priority level management table 81 and an importance level management table 82, which will be explained hereinbelow).

As sub-programs thereof, for example, the file sharing program 26 comprises a read request receive process program 261; a write request receive process program 262; and an appropriate usage determination process program 263. The processing for carrying out the read request receive process program 261, write request receive process program 262, and appropriate usage determination process program 263 will be described in detail hereinbelow.

As sub-programs thereof, for example, the OS 27 comprises a kernel, a file system having the above-described file sharing functions, and a TCP/IP processor; a packet monitoring process program 271; and a device driver 272. In addition, the device driver 272 comprises a path sorting process program 273 as a sub-program thereof. The processing carried out by the packet monitoring process program 271 and the path sorting process program 273 will be described in detail hereinbelow.

Figure 3:
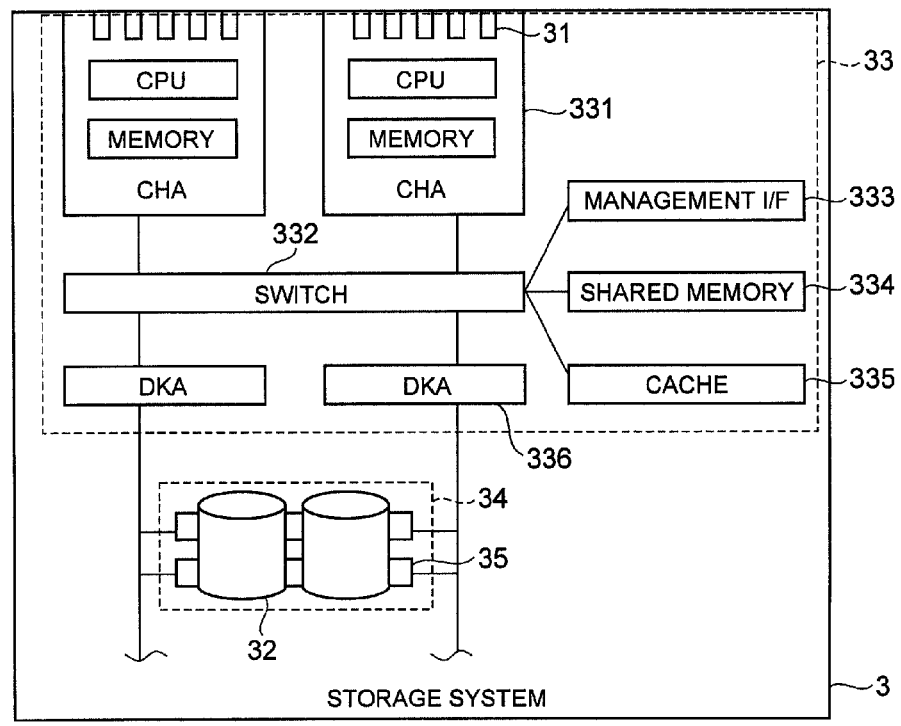
FIG. 3 is a diagram showing an example of the internal configuration of a storage system.

FIG. 3 is a diagram showing an example of the internal configuration of the storage system 3.

As the controller 33 thereof, the storage system 3, for example, comprises a CHA (Channel Adapter) 331; DKA (Disk Adapter) 336; switch 332; shared memory 334; cache memory (hereinafter, referred to simply as the "cache") 335;

and management I/F 333. The storage system 3 controller 33 controls access to a storage device 35.

The CHA 331 is for carrying out data communications with the NAS 2 and another storage system 3, and comprises either one or a plurality of communication ports 31. The CHA 331 is configured as a microcomputer system (for example, a circuit board) comprising a CPU and a memory. When there is a write request from the NAS 2, the CHA 331, for example, respectively writes the write-targeted data to the cache 335, and the command received from the NAS 2 to the shared memory 334. When there is a read request from the NAS 2, the CHA 331 writes the command received from the NAS 2 to the shared memory 334, and sends to the NAS 2 the read-targeted data, which the DKA 336 has read out from the storage device 35 and written to the cache 335.

The DKA 336 is for carrying out the exchange of data with the respective storage devices 35. The respective DKA 336, like the CHA 331, can also be configured as microcomputer systems comprising CPUs and memories. The DKA 336, for example, writes the write-targeted data written to the cache 335 from the CHA 331 to the storage device 35, and writes the read-targeted data read out from the storage device 35 to the cache 335.

The switch 332, for example, is a cross-bar switch, and is a device for interconnecting the CHA 331, DKA 336, shared memory 334, cache 335, and management I/F 333. A bus or other type connector can be used instead of the switch 332.

The shared memory 334, for example, can be configured from either a nonvolatile or a volatile semiconductor memory. The shared memory 334, for example, stores various types of commands received from the NAS 2 and control information used to control the storage system 3. The commands and storage information can be stored redundantly in accordance with a plurality of shared memories 334.

The cache 335, for example, can be configured from either a volatile or a nonvolatile semiconductor memory. The cache 335 stores data received from the NAS 2, and data read out from the storage device 35. Furthermore, the shared memory 334 and the cache 335 either can be configured as respectively different memories as in this embodiment, or can be configured from a single memory. When configured from a single memory, for example, one part of the memory is used as the cache area, and a different part of the same memory is used as the shared memory area.

Further, for example, one or more RAID groups 34 are also configured from a plurality of storage devices 35 in the storage system 3. The RAID group 34, for example, provides a storage mode that has been made redundant on the basis of RAID 1 or RAID 5. A LU 32 is created by the allocation of one part each of the respective storage areas of the plurality of storage devices 35 comprising the RAID group 34. The LU 32 is provided to the NAS 2 from the storage system 3.

Figure 4:
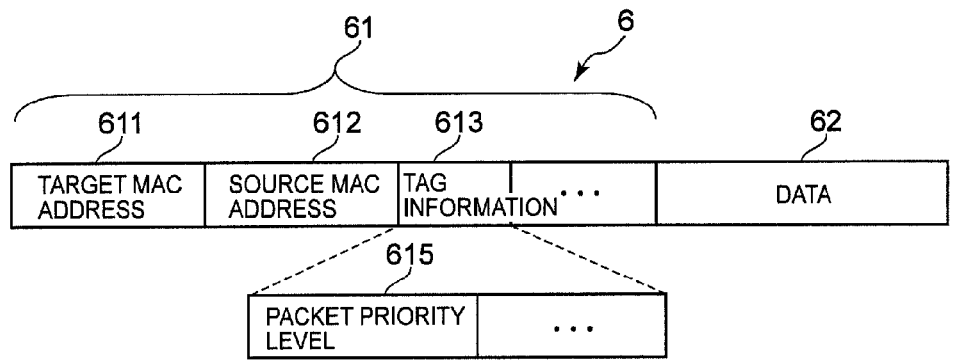
FIG. 4 is a diagram showing an example of the configuration of packet data.

FIG. 4 is a diagram showing an example of the configuration of the packet data 6.

As described above, a file access request and other such data that flows over the communication network 4 is divided up and sent as packet data 6 of a prescribed size. The packet data 6, for example, is configured from a packet header 61 and data 62. The packet header 61, for example, comprises a destination MAC address 611; a source MAC address 612; and tag information 613. The tag information 613 comprises a packet priority level 615. The packet priority level 615 is the priority level related to the relevant packet data 6. For example, processing (for example, a data transfer) is carried out by giving high priority to packet data 6 for which a high packet priority level 615 has been set, and treating the relevant packet data 6 accordingly. The packet priority level 615 of packet data 6 sent by the client 1, for example, is set by the client 1 (the application running on the client 1) or the user who is utilizing the client 1. The client 1 and the user thereof, for example, can set a packet priority level 615 for each file access request, or for each application that issues an access request. Therefore, ordinarily, the same packet priority level 615 is set for the respective packet data 6 configuring a single file access request.

When packet data 6 configures a file access request, the information comprising the file access request (that is, the read command, write command, or write-targeted file 22) constitutes the data 62. Similarly, when packet data 6 configures the response to a file read request, the information comprising this response (that is, the read-targeted file 22) becomes the data 62.

Figure 5:
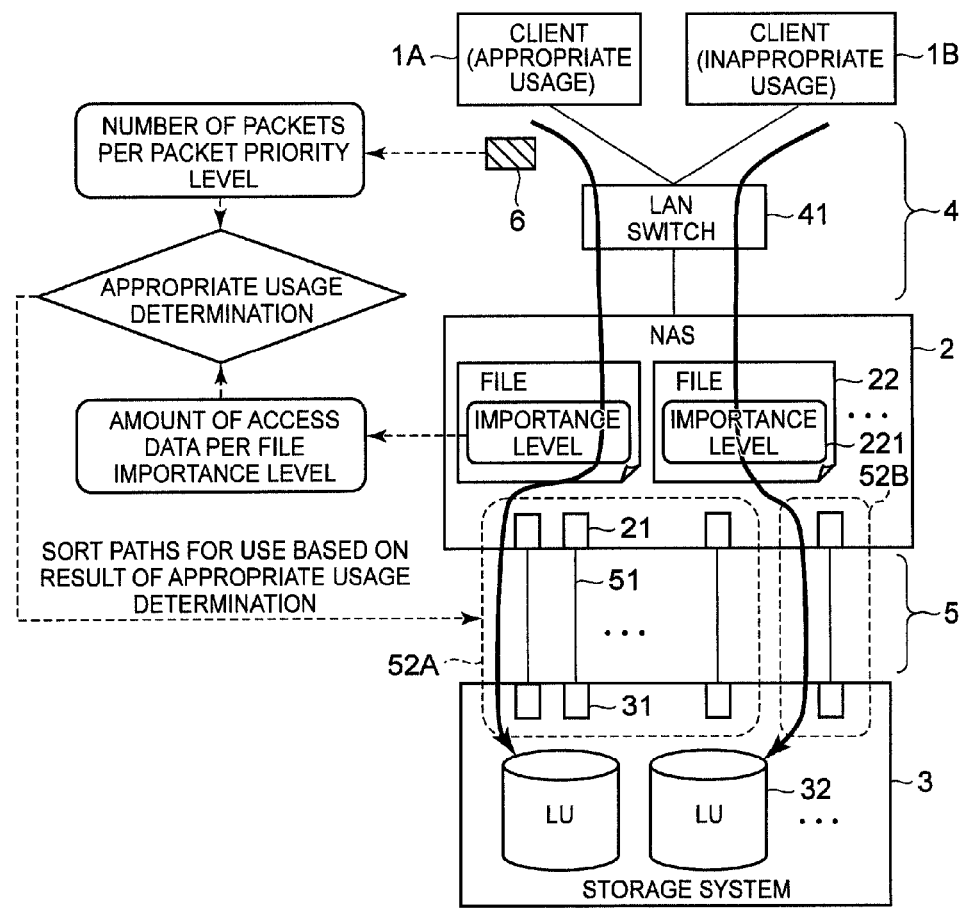
FIG. 5 is a diagram illustrating the main features of a NAS related to this embodiment.

FIG. 5 is a diagram illustrating the main features of the NAS 2 related to this embodiment.

The NAS 2 monitors the packet data 6 exchanged with the client 1 in the packet data 6 recognition layer. Then, the NAS 2 counts the number of exchanged packet data 6 (hereinafter, the "number of packets") for each packet priority level 615 set for the packet data 6. The packet data 6 comprises a prescribed data length (hereinafter, the "packet length"). Therefore, the number of packets counted for each packet priority level 615 indirectly shows the amount of data of the exchanged packet data 6 (hereinafter, the "amount of data exchanged") for each packet priority level 615. Incidentally, the amount of data exchanged can be obtained by multiplying the packet length by the number of packets. The packet data 6 that the NAS 2 exchanges with the client 1 is ordinarily packet data 6 that configures a file access request or a response to a file access request. As described hereinabove, a file write request comprises a write-targeted file 22, and a response to a file read request comprises a read-targeted file 22. A file access request also comprises information besides a file 22 (that is, either a read command or a write command), but the amount of command data is generally relatively smaller than the amount of data of the file 22, and depending on the file 22, this difference can be extremely great. For example, when a file 22, which has an amount of data so large that the amount of command data can be ignored, is exchanged while continuously counting the number of packets, the amount of command data relative to the amount of data exchanged can be considered small enough to be ignored. That is, in this case, the amount of data exchanged (excluding the amount of data of the packet data 6) constitutes a value approximating the cumulative amount of data of the file 22 that is targeted for access.

Conversely, the NAS 2 measures the cumulative total (hereinafter, the "amount of access data") of the amount of data of the access-targeted file 22 (file size) for each file importance level 221 set in the relevant file 22 in the file access request recognition layer. Furthermore, the file importance level 221 is a value showing the importance of the file 22. The file importance level 221, for example, is set by the NAS 2 administrator for each file 22. Therefore, the person who sets the file importance level 221 differs from the person who sets the packet priority level 615.

The counting of the number of packets and measuring of the amount of access data are carried out by the client 1. The NAS 2, for example, can use the MAC address of the client 1 to identify the client 1. Hereinafter, information for identifying the client 1 (in this embodiment, the MAC address of the client 1) will be called the "client identifier". The NAS 2 can reference the source MAC address 612 acquired from the received packet data 6 in the packet data 6 recognition layer as the client identifier. Further, the NAS 2 can reference the MAC address achieved by converting the source IP address acquired from a file access request in the file access request recognition layer as the client identifier.

The NAS 2 determines whether or not the client 1 is appropriately using the file sharing area 23 based on the amount of data per packet priority level 615 and the amount of access data per file importance level 221. Hereinafter, this determination will be called the "appropriate usage determination". The appropriate usage determination is carried out by the appropriate usage determination process program 263. The appropriate usage determination will be explained in detail hereinbelow.

The NAS 2 can switch the process control for a file access request for each client 1 based on the result of the appropriate usage determination. For example, when it has been determined that the client 1 from which a file access request was sent is a client 1 that is using the file sharing area 23 appropriately (hereinafter, the "appropriate usage client"), the NAS 2 can send the block access request corresponding to this file access request to the storage system 3 using the path 52A to the appropriate usage client that has more paths (and/or faster paths). By contrast, when it has been determined that the client 1 from which a file access request was sent is a client 1 that is not using the file sharing area 23 appropriately (hereinafter, the "inappropriate usage client"), the NAS 2 can send the block access request corresponding to this file access request to the storage system 3 using a surplus path (path 52B to the inappropriate usage client) other than the path 52A to the appropriate usage client. Consequently, the NAS 2 is able to prioritize and process the file access request of the appropriate usage client.

FIG. 6 is a diagram showing an example of a priority level management table 81.

The priority level management table 81 is for managing the number of packets counted in the packet data 6 recognition layer for each packet priority level 615.

The priority level management table 81, for example, comprises a column 811 for storing the client identifier; and a column 814 for the packet priority level. The packet priority level column 814 comprises columns for the respective values (in this embodiment, integers from "0" to "7") capable of being used as packet priority levels 615. The respective columns for the packet priority levels 615 ("0" to "7") comprise a column 812 for storing the number of packets; and a column 813 for storing the update date/time. The update date/time shows the date and time at which the number of packets of the corresponding packet priority level 615 were updated. Therefore, the number of packets and update date/time are recorded in the priority level management table 81 for the respective client identifiers for each packet priority level 615.

For example, when the NAS 2 (the packet monitoring process program 271) detects the receipt of packet data 6, the NAS 2 can update the contents of the priority level management table 81 as follows. That is, the NAS 2 acquires the source MAC address 612 and packet priority level 615 from this received packet data 6. This acquired source MAC address 612 constitutes the client identifier. Then, the NAS 2 adds 1 (increments the number of packets by 1) to the value of the column 812 for the number of packets corresponding to the acquired client identifier and the acquired packet priority level 615. Further, the NAS 2 stores the relevant date and time in the column 813 of the update date/time corresponding to the acquired client identifier and the acquired packet priority level 615. The above-mentioned addition to the number of packets and the updating at the update date/time are carried out repeatedly each time the receipt of packet data 6 is detected.

Conversely, the NAS 2 can substitute an approximate value for the packet data 6 that the NAS 2 sends without actually counting the number of these packets. For example, for packet data 6 configuring a response to a file access request (that is, packet data 6 comprising a read-targeted file 22 as the data 62), the NAS 2 can treat a quotient, which has been obtained by dividing the file size of this read-targeted file 22 by the packet length, as the number of packets thereof. The packet priority level 615 to which this number of packets is to be added (the number of packets related to the response to the file read request) is the packet priority level 615 that has been set in the file read request constituting the basis of this response (the packet data 6 configuring the file read request). This is because the packet priority level 615 set in the file read request is the packet priority level 615 set for access to the read-targeted file 22. When the receipt of the packet data 6 configuring the file read request is detected, the number of packets and update date/time thereof are reflected in the priority level management table 81. Therefore, when sending the response to the file read request, the NAS 2 can infer that the packet priority level 615, in which the update date/time related to the client 1 that constitutes the destination of this response is the most recent, is the packet priority level 615 to which the number of packets related to this response is to be added.

FIG. 7 is a diagram showing an example of the importance level management table 82.

The importance level management table 82 is for managing the amount of access data measured in the file access request recognition layer for each file importance level 221.

The importance level management table 82, for example, comprises a column 821 for storing the client identifier; and a column 823 for the file importance level. The file importance level column 823 comprises columns for the respective values capable of being used as file importance levels 221 (the same as the values capable of being used as packet priority levels 615, in this embodiment, integers from "0" to "7"). The respective columns for the file importance levels ("0" to "7") comprise columns 822 for storing the amounts of access data. Therefore, the amounts of access data for the respective client identifiers are recorded in the importance level management table 82 for each file importance level 221.

For example, when the NAS 2 (either the read request receive process program 261 or the write request receive process program 262) receives a file access request, the NAS 2 can update the contents of the importance level management table 82 as follows. That is, the NAS 2 acquires information specifying the source IP address and access-targeted file 22 from this received file access request. The MAC address realized by converting this acquired source IP address constitutes the client identifier. Further, the NAS 2 acquires from the file system the file size of the access-targeted file 22 and the file importance level 221 set in this file 22. Then, the NAS 2 adds the acquired file size to the value of the column 822 for the amount of access data corresponding to the acquired client identifier and the acquired file importance level 221. The above-mentioned addition of the amount of access data is repeatedly carried out each time a file access request is received.

FIG. 8 is a diagram showing an example of an appropriate usage determination result file 83.

The appropriate usage determination result file 83 is the file in which the result of an appropriate usage determination carried out by the appropriate usage determination process program 263 is recorded. In the appropriate usage determination result file 83, for example, an appropriate usage determination result for a client 1 specified by the client identifier thereof is recorded for each client identifier. If the result is "appropriate usage client", the relevant client 1 is determined to be a client 1 that is using the file sharing area 23 appropriately. Conversely, if the result is "inappropriate usage client", the relevant client 1 is determined to be a client 1 that is not using the file sharing area 23 appropriately.

FIG. 9 is a diagram showing an example of a definition file 84.

The definition file 84 is referenced to decide the path to be utilized when sending a block access request based on the appropriate usage determination result. For example, the path 52A to the appropriate usage client and the path 52B to the inappropriate usage client are recorded in the definition file 84.

In the example of FIG. 9, the paths defined under "Usable Paths" within the tag "<Used Appropriately>" (that is, "PATH-001" through "PATH-005") constitute the path 52A to the appropriate usage client. Conversely, the path defined within the tag "<Not Used Appropriately>" (that is, "PATH-006") constitutes the path 52B to the inappropriate usage client. Therefore, for example, when it has been determined that the client 1, which sent the file access request, is the appropriate usage client, the NAS 2 can use any one or more of "PATH-001" through "PATH-005" to send the storage system 3 a block access request corresponding to this file access request. Furthermore, in the example of FIG. 9, the path 52A to the appropriate usage client is defined such that the path to be used can be switched in accordance with the file size of the access-targeted file 22. That is, in the case of FIG. 9, if the file size is 100 MB or more, the NAS 2 can use any one or more of "PATH-001", "PATH-002" and "PATH-003 " to send the block access request. Conversely, if the file size is smaller than 100 MB, the NAS 2 can use "PATH-004" and/or "PATH-005" to send the block access request.

The preceding is an explanation of the configuration of the computer system related to this embodiment.

Next, a method for determining appropriate usage will be explained. As described hereinabove, in determining appropriate usage, a determination is made as to whether or not a client 1 is an appropriate usage client or an inappropriate usage client based on the number of packets per packet priority level 615 and the amount of access data per file importance level 221. The appropriate usage determination is carried out by the appropriate usage determination process program 263. Hereinafter, in the explanation of this appropriate usage determination method, the client 1, which is the target of the appropriate usage determination, will be called the "target client 1".

The appropriate usage determination determines the extent to which the target client 1 is carrying out the specified usage (for example, the ideal usage), which calls for sending a file access request by setting a packet priority level of the same value as the file importance level set in the access-targeted file. If the extent of specified usage is more than a prescribed extent, the target client 1 is determined to be an appropriate usage client, and if the extent of ideal usage is less than the prescribed extent, the target client 1 is determined to be an inappropriate usage client.

Appropriate usage determination methods, for example, can include a plurality of types, for example, the following three types. Any one type of method from among the three types of methods can be used alone, two or more types of the three types can be used, or the determination results of the respective types of methods can be summed up, and used to make a final determination as to whether the target client 1 is engaging in appropriate usage or inappropriate usage. In all of the three types of methods mentioned above, the range of employable packet priority level 615 values and the range of employable file importance level 221 values are defined identically, but these ranges do not necessarily have to be the same, and for example, it is enough for the packet priority level 615 and the file importance level 221 to correspond on a one-to-one basis. In this embodiment, as mentioned hereinabove, the employable range of values for both the packet priority level 615 and the file importance level 221 is integers from "0" to "7".

<(1) Data Amount Comparison Method>

The first method compares the amount of data (amount of exchanged data) obtained from the priority level management table 81 against the amount of data (amount of access data) obtained from the importance level management table 82, and determines whether the target client 1 is an appropriate usage client or an inappropriate usage client based on the size of this difference. A determination using this method is carried out using the following procedure.

First, the appropriate usage determination process program 263 selects one value (for example, the highest value of "7") from among the values capable of being employed for the packet priority level 615 and file importance level 221. In the explanation of method (1), this selected value will be called the "selection value".

Next, the appropriate usage determination process program 263 acquires from the priority level management table 81 the client identifier of the target client 1 and the number of packets corresponding to the selection value of the packet priority level 615. Then, the appropriate usage determination process program 263 multiplies the packet length by the acquired number of packets to determine the amount of exchanged data related to the selection value of the packet priority level 615.

Further, the appropriate usage determination process program 263 acquires from the importance level management table 82 the client identifier of the target client 1 and the amount of access data corresponding to the selection value of the file importance level 221.

Then, the appropriate usage determination process program 263 compares the amount of exchanged data against the amount of access data, and if this difference is less than the prescribed value, determines the target client 1 to be an appropriate usage client, and if this difference is greater than the prescribed value, determines the target client 1 to be an inappropriate usage client.

Furthermore, the amount of exchanged data also comprises the amount of data of the packet header 61. When the amount of data of the packet header 61 is such that it cannot be ignored in comparison to the amount of exchanged data, an amount of data, which is realized by subtracting the amount of data of the packet header 61 from the amount of exchanged data, can be used in place of the amount of exchanged data (that is, as the amount of data targeted for comparison against the amount of access data). For example, if the packet header 61 data length is a fixed length, the amount of packet header 61 data is determined by multiplying the packet header 61 data length by the number of packets acquired from the priority level management table 81.

<(2) Mean Value Comparison Method>

The second method compares a mean value of the packet priority levels 615 computed from the priority level management table 81 against a mean value of the file importance levels 221 computed from the importance level management table 82, and determines whether the target client 1 is an appropriate usage client or an inappropriate usage client based on the size of this difference. In this embodiment, the mean value of the packet priority levels 615 is a value computed using mathematical expression (A) based on information recorded in the priority level management table 81 (that is, the value of a weighted average using the packet priority level as the data and the number of packets as the weight). Further, in this embodiment, the mean value of the file importance levels 221 is a value computed using mathematical expression (B) based on information recorded in the importance level management table 82 (that is, the value of a weighted average using the file importance level as the data and the amount of access data as the weight). The appropriate usage determination process program 263 compares the difference between the mean value of the packet priority levels 615 and the mean value of the file importance levels 221, and if this difference is less than a prescribed value, determines that the target client 1 is an appropriate usage client, and if this difference is greater than the prescribed value, determines that the target client 1 is an inappropriate usage client.

Mean Value of Packet Priority Levels={0×number of packets of packet priority level "0"+1×number of packets of packet priority level "1"+ . . . +7×number of packets of packet priority level "7"}/Total Number of Packets (value achieved by totaling the respective number of packets of packet priority levels "0" through "7")     Mathematical Expression (A)

Mean Value of File Importance Levels={0×amount of access data of file importance level "0"+1× amount of access data of file importance level "1"+ . . . +7×amount of access data of file importance level "7"}/Total Amount of Access Data (value achieved by totaling the respective amounts of access data of file importance levels "0" through "7")     Mathematical Expression (B)

<(3) Ratio Value Variance Method>

The third method computes the variance of the values of the ratios between the number of packets in the priority level management table 81 and the amount of access data in the importance level management table 82, and determines whether the target client 1 is an appropriate usage client or an inappropriate usage client based on the size of this ratio value variance. A determination using this method is carried out using the following procedure.

First, the appropriate usage determination process program 263 finds the values of the ratios between the number of packets in the priority level management table 81 and the amount of access data in the importance level management table 82 for each of the values capable of being employed as the packet priority level 615 and file importance level 221. For example, when the priority level management table 81 is as shown in FIG. 6, and the importance level management table 82 is as shown in FIG. 7, the ratio of the number of packets to the amount of access data is found as in FIG. 10 for each value capable of being employed as the packet priority level 615 and file importance level 221.

Next, the appropriate usage determination process program 263, for example, uses mathematical expression (C) to compute the variance of the values of the plurality of ratios that were found. Here, i is a value capable of being employed as the packet priority level 615 and the file importance level 221, that is, i is an integer from "0" to "7". Ri is the value of the ratio of the number of packets and the amount of access data, in which the packet priority level 615 and file importance level 221 is i. Rm is the mean value of the values of the ratios of the numbers of packets and amounts of access data. In this embodiment, the mean value of the values of the ratios of the numbers of packets and amounts of access data is computed by using, for example, mathematical expression (D).

Then, the appropriate usage determination process program 263 determines that the target client 1 is an appropriate usage client if the computed variance of ratio values is less than a prescribed value, and determines that the target client 1 is an inappropriate usage client if the computed variance of ratio values is greater than the prescribed value.

$$\sigma^2 = \frac{1}{8}\sum_{i=0}^{7}(R_i - R_m)^2$$     Mathematical Expression (C)

$$R_m = R_0 + R_1 + \ldots + R_7 / 8$$     Mathematical Expression (D)

The flow of processing executed by the NAS 2 related to this embodiment will be explained hereinbelow.

Figure 11:
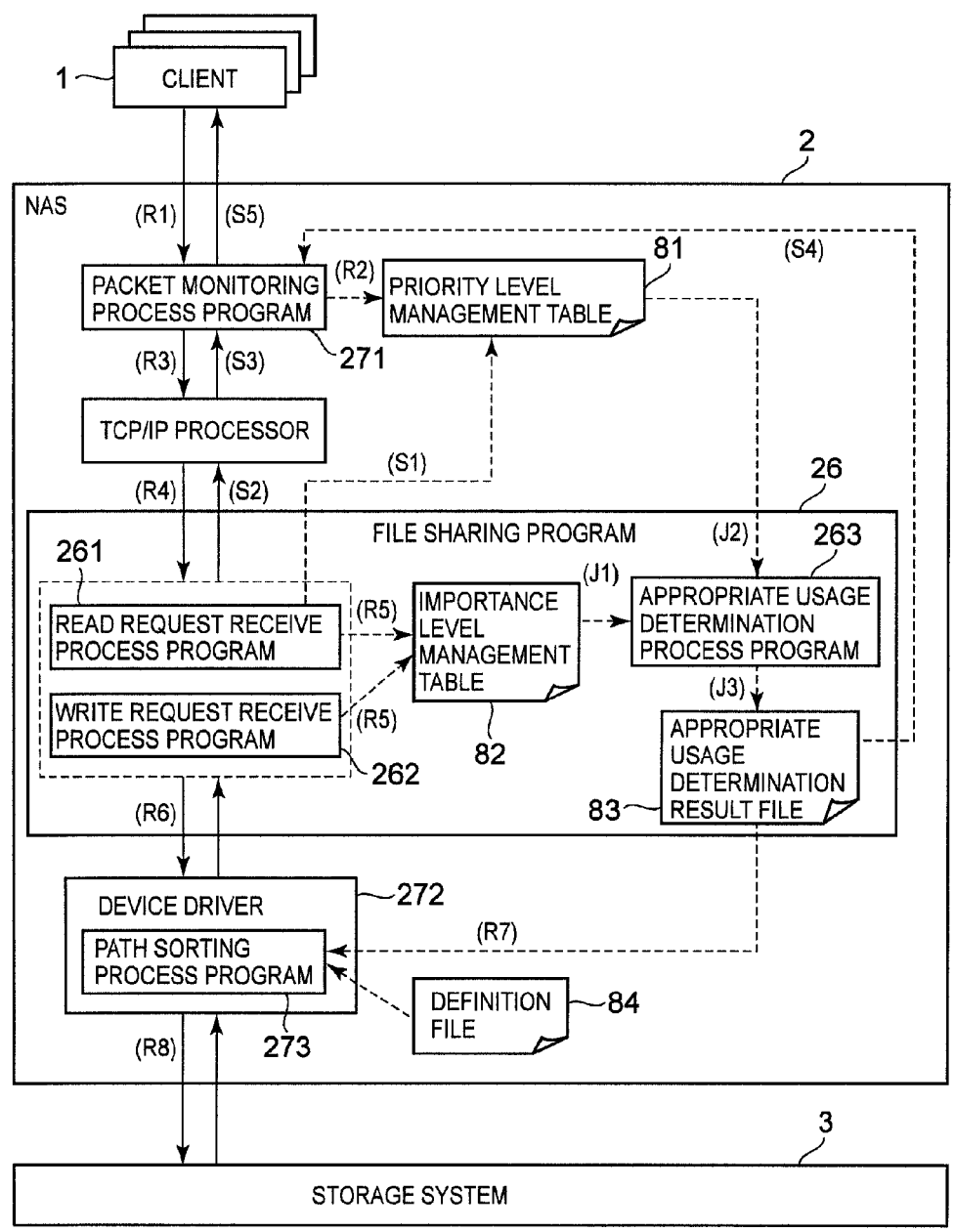
FIG. 11 is a diagram showing an overview of processing carried out by a NAS related to this embodiment.

FIG. 11 is a diagram showing an overview of the processing carried out by the NAS 2 related to this embodiment.

First, an overview of the processing carried out by the NAS 2 when a file access request is received will be explained.

When the NAS 2 receives packet data 6 configuring a file access request (R1), the packet monitoring process program 271 acquires the source MAC address 612 and packet priority level 615 from the received packet data 6, and performs updating of the priority level management table 81 (R2). Then, the packet monitoring process program 271 transfers the received packet data 6 to the TCP/IP processor (R3). The TCP/IP processor, which receives the packet data 6 from the packet monitoring process program 271, combines a plurality of packet data 6, extracts the file access request, and transfers the extracted file access request to the file sharing program 26 (R4). When the file access request is a file read request, the read request receive process program 261 carries out processing for the file read request received from the TCP/IP processor. Conversely, when the file access request is a file write request, the write request receive process program 262 carries out processing for the file write request received from the TCP/IP processor. A file write request will be explained here. The write request receive process program 262, which receives the file write request from the TCP/IP processor, acquires information specifying the source IP address and write-targeted file 22 from the file write request. Then, the write request receive process program 262 acquires from the file system the file size of the write-targeted file 22, and the file importance level 221 set in the write-targeted file 22, and carries out updating of the importance level management table 82 (R5). Then, the write request receive process program 262 issues an indication to the device driver 272 to write block data 7 configuring the write-targeted file 22 to the LU 32 of the storage system 3 (R6). When the device driver 272 receives the write indication, the path sorting process program 273 references the appropriate usage determination result file 83 and the definition file 84, and decides the path to be used when sending the request for writing the block data 7 (the block write request) (R7). The path sorting process program 273 sends the block write request to the storage system 3 using the decided path (R8).

Next, an overview of the processing carried out by the NAS 2 when sending a response to a file read request will be explained.

The read request receive process program 261 acquires from the file system the file size of the read-targeted file 22. Then, the read request receive process program 261 treats a quotient, which has been obtained by dividing the file size of the read-targeted file 22 by the packet length, as the number of packets related to the response to the file read request (the number of packets of packet data 6 configuring the response), and updates the priority level management table 81 (S1). The packet priority level 615 to which the number of packets related to the response are to be added at this time is the packet priority level 615 having the most recent update date/time. Then, the read request receive process program 261 transfers the response relative to the file read request to the TCP/IP processor (S2). The TCP/IP processor, which receives the response relative to the file read request from the read request receive process program 261, splits this response into a plurality of packet data 7, and sends this split packet data 7 to the client 1 by way of the packet monitoring process program 271 (S3, S5). The packet monitoring process program 271 can reference the appropriate usage determination result file 83, and reset the packet priority level 615 of the packet data 7 being sent to the proper value at this time (S4).

Next, an overview of appropriate usage determination processing will be explained. The appropriate usage determination process, for example, is carried out, either regularly (for example, once a day, or once every half a day) or irregularly, asynchronously to the processing when the file access request is received and to the processing when the response to the file access request is sent.

When an appropriate usage determination process is commenced, the appropriate usage determination process program 263 references the priority level management table 81 and the importance level management table 82, and carries out appropriate usage determinations (J1, J2). Then, the appropriate usage determination process program 263 records the appropriate usage determination results in the appropriate usage determination result file 83 (J3).

Figure 12:
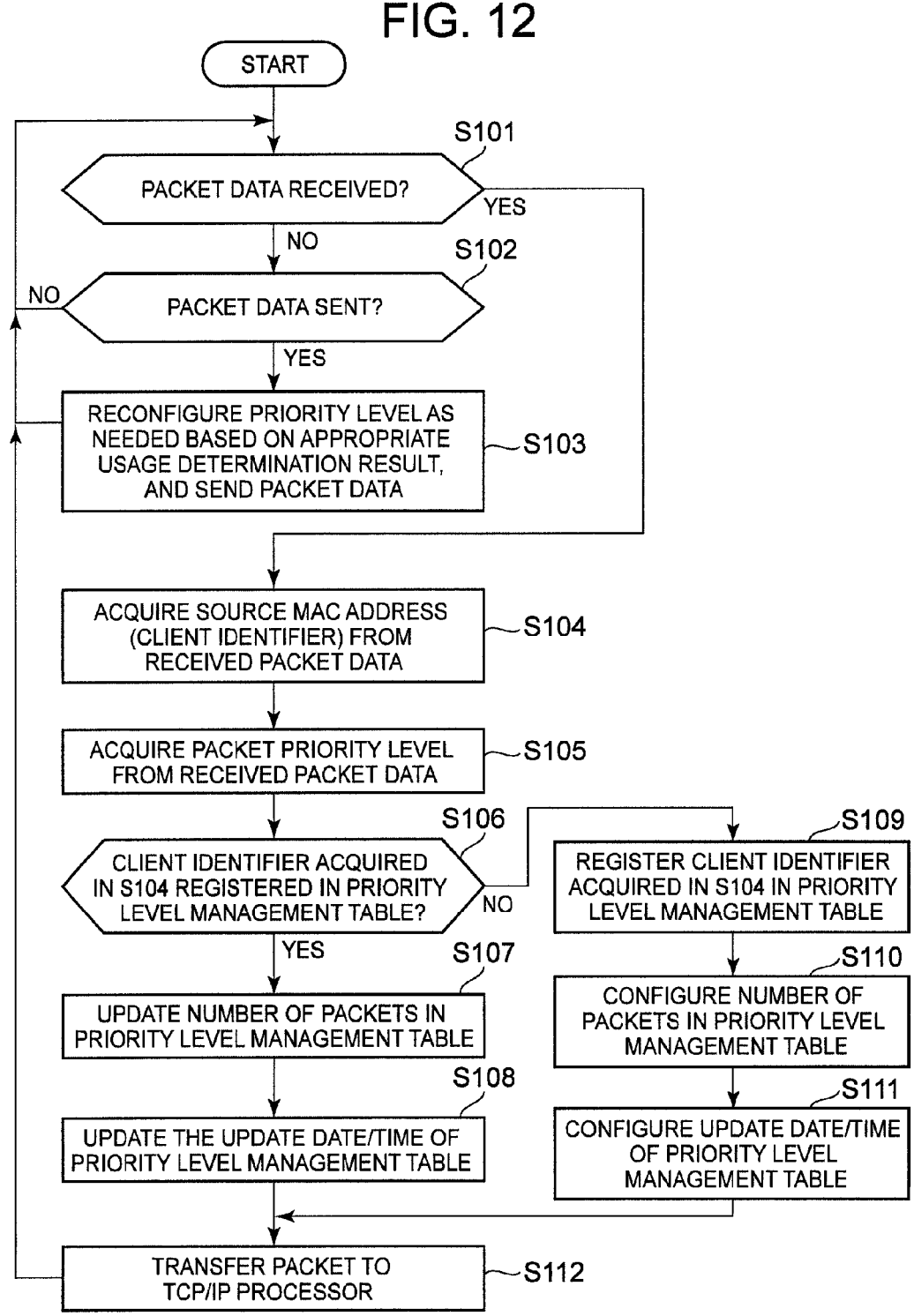
FIG. 12 is a flowchart of processing carried out by a packet monitoring process program.

FIG. 12 is a flowchart of the processing carried out by the packet monitoring process program 271.

When packet data 6 sent to the client 1 has been detected (S101: NO and S102: YES), the packet monitoring process program 271 resets the packet priority level 615 of the detected packet data 6 to the proper value as needed based on the appropriate usage determination result, and sends the detected packet data 6 to the client 1 (S103). For example, when it has been determined that the destination client 1 is an inappropriate usage client, the packet monitoring process program 271 can reset the packet priority level 615 in the detected packet data 6 to a value that is lower than the packet priority level 615 set in the detected packet data 6 at this time, or to the lowest packet priority level 615. Furthermore, the packet priority level 615 that is set in the detected packet data 6 at this time, for example, can be considered to be the packet priority level-615 set in the packet data 6 configuring the file access request, which constitutes the source of the response being configured by this packet data 6 (that is, the packet priority level 615 set by the client 1 or user of the client 1). By so doing, the NAS 2 is able to forcibly set the packet priority level 615 low, and return a response relative to the file access request even when an inappropriate usage client has sent a file access request by setting an unduly high packet priority level 615.

Conversely, when the receipt of packet data 6 from the client 1 is detected (S101: YES), the packet monitoring process program 271 acquires the source MAC address 612 from the received packet data 6 (S104). The source MAC address 612 acquired in S104 constitutes the client identifier of the client 1 that sent the packet data 6 detected in S101.

Next, the packet monitoring process program 271 acquires the packet priority level 615 from the received packet data 6 (S105).

Thereafter, the packet monitoring process program 271 determines whether or not the client identifier acquired in S104 is registered in the priority level management table 81 (S106).

When the client identifier acquired in S104 is registered in the priority level management table 81 (S106: YES), the packet monitoring process program 271 increments by 1 the number of packets corresponding to the client identifier acquired in S104 and the packet priority level 615 acquired in S105 (S107).

Further, the packet monitoring process program 271 updates the update date/time corresponding to the client identifier acquired in S104 and the packet priority level 615 acquired in S105 to the current date/time (S108).

Thereafter, the packet monitoring process program 271 transfers the received packet data 6 to the TCP/IP processor (S112).

Conversely, when the client identifier acquired in S104 is not registered in the priority level management table 81 (S106: NO), the packet monitoring process program 271 registers the client identifier acquired in S104 in the priority level management table 81 (S109).

Thereafter, the packet monitoring process program 271 sets the number of packets corresponding to the client identifier acquired in S104 and the packet priority level 615 acquired in S105 to 1 (S110).

Further, the packet monitoring process program 271 sets the update date/time corresponding to the client identifier acquired in S104 and the packet priority level 615 acquired in S105 to the current date/time (S111).

Thereafter, the packet monitoring process program 271 transfers the received packet data 6 to the TCP/IP processor (S112).

Figure 13:
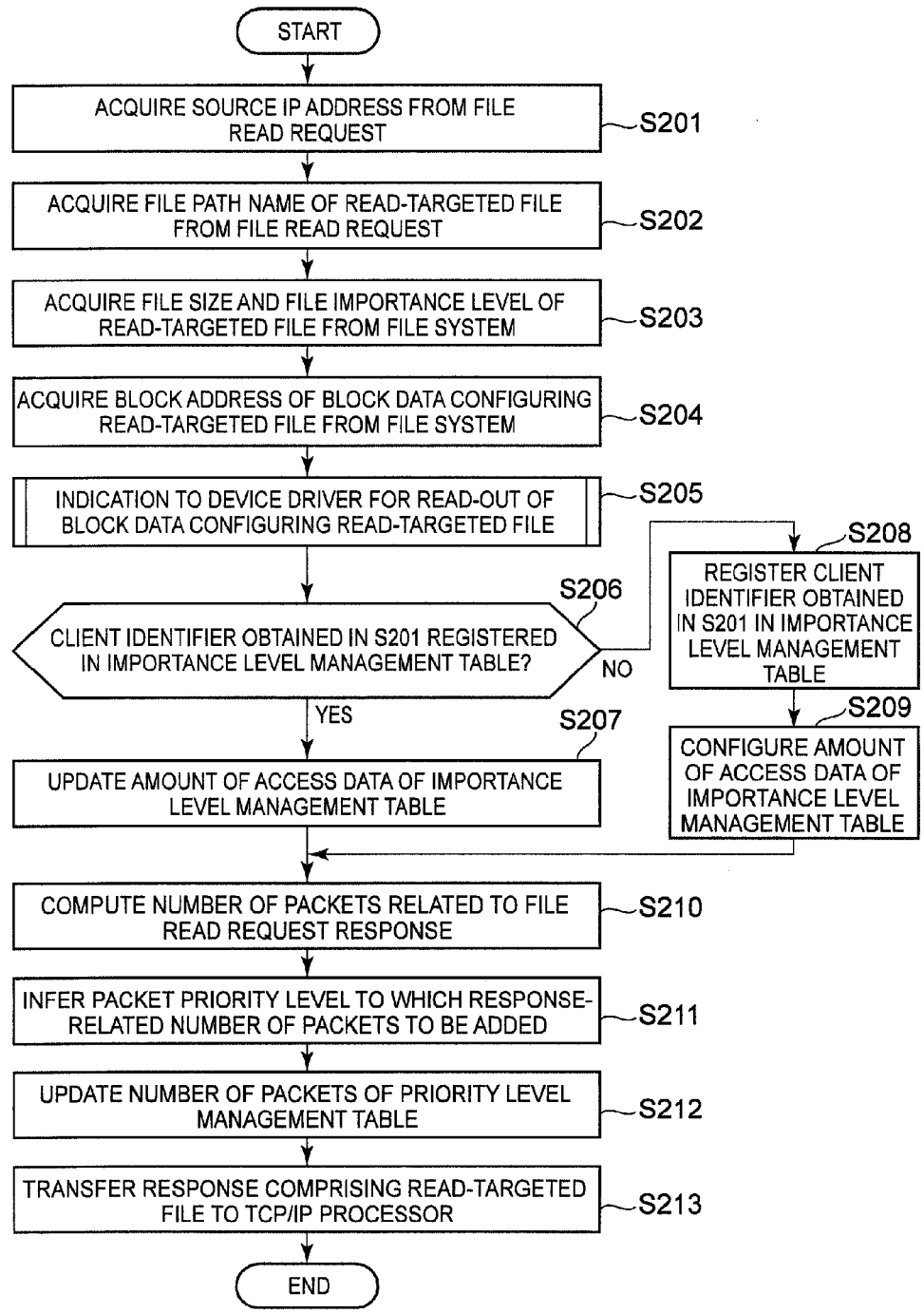
FIG. 13 is a flowchart of processing carried out by a read request receive process program.

FIG. 13 is a flowchart of the processing carried out by the read request receive process program 261.

The processing of FIG. 13 is carried out when a file read request received from the client 1 is received from the TCP/IP processor.

First, the read request receive process program 261 acquires the source IP address from the file read request received from the TCP/IP processor (S201). The MAC address achieved by converting the source IP address acquired in S201 constitutes the client identifier of the client 1 that sent the file read request.

Next, the read request receive process program 261 acquires information (the file path name) for specifying the read-targeted file 22 from the file read request received from the TCP/IP processor (S202).

Next, the read request receive process program 261 acquires from the file system the file size of the read-targeted file 22 and the file importance level 221 set in the read-targeted file 22 (S203).

Next, the read request receive process program 261 acquires from the file system the respective block addresses of the block data 7 configuring the read-targeted file 22 (S204).

Thereafter, the read request receive process program 261 causes the device driver 272 to read out the block data 7 configuring the read-targeted file 22 to the LU 32 of the storage system 3 (S205). At this time, the read request receive process program 261 can notify the device driver 272 of the client identifier obtained in S201 and the file size acquired in S203. In S205, the path sorting process program 273 of the device driver 272 sends the block read request to the storage system 3, and reads out the block data 7 configuring the read-targeted file 22 from the LU 32.

Thereafter, the read request receive process program 261 determines whether or not the client identifier obtained in S201 is registered in the importance level management table 82 (S206).

When the client identifier obtained in S201 has been registered in the importance level management table 82 (S206: YES), the read request receive process program 261 adds the file size acquired in S203 to the amount of access data corresponding to the client identifier obtained in S201 and the file importance level 221 acquired in S203 (S207).

Conversely, when the client identifier obtained in S201 has not been registered in the importance level management table 82 (S206: NO), the read request receive process program 261 registers the client identifier obtained in S201 in the importance level management table 82 (S208).

Thereafter, the read request receive process program 261 sets the file size acquired in S203 in the amount of access data corresponding to the client identifier obtained in S201 and the file importance level 221 acquired in S203 (S209).

Thereafter, the read request receive process program 261 carries out processing (S210 through S213) related to sending a file read request-related response, which comprises the file 22 (read-targeted file 22) configured from the block data 7 read out in S205. Furthermore, the processing of S210 through S213 does not necessarily have to be carried out consecutively subsequent to the processing of S209. For example, the processing of S210 through S213 can be carried out upon receiving notification from the device driver 272 that the read-out of the block data 7 configuring the read-targeted file 22 has been completed.

The read request receive process program 261 computes the number of packets related to the file read request response (S210). That is, the read request receive process program 261 divides the file size of the read-targeted file 22 by the packet length, and makes this quotient the number of packets related to the file read request response.

Next, the read request receive process program 261 infers the packet priority level 615 to which the number of packets related to the file read request response is to be added (S211). That is, the read request receive process program 261 infers that the packet priority level 615 with the most recent update date/time related to the client 1 that constitutes the destination of this response is the packet priority level 615 which will add the number of packets related to this response.

Next, the read request receive process program 261 adds the number of packets computed in S210 (response-related number of packets) to the number of packets corresponding to the client identifier of the client 1, which is the destination of the file read request response, and the packet priority level 615 inferred in S211 (S212).

Thereafter, the read request receive process program 261 transfers the file read request response to the TCP/IP processor (S213).

Figure 14:
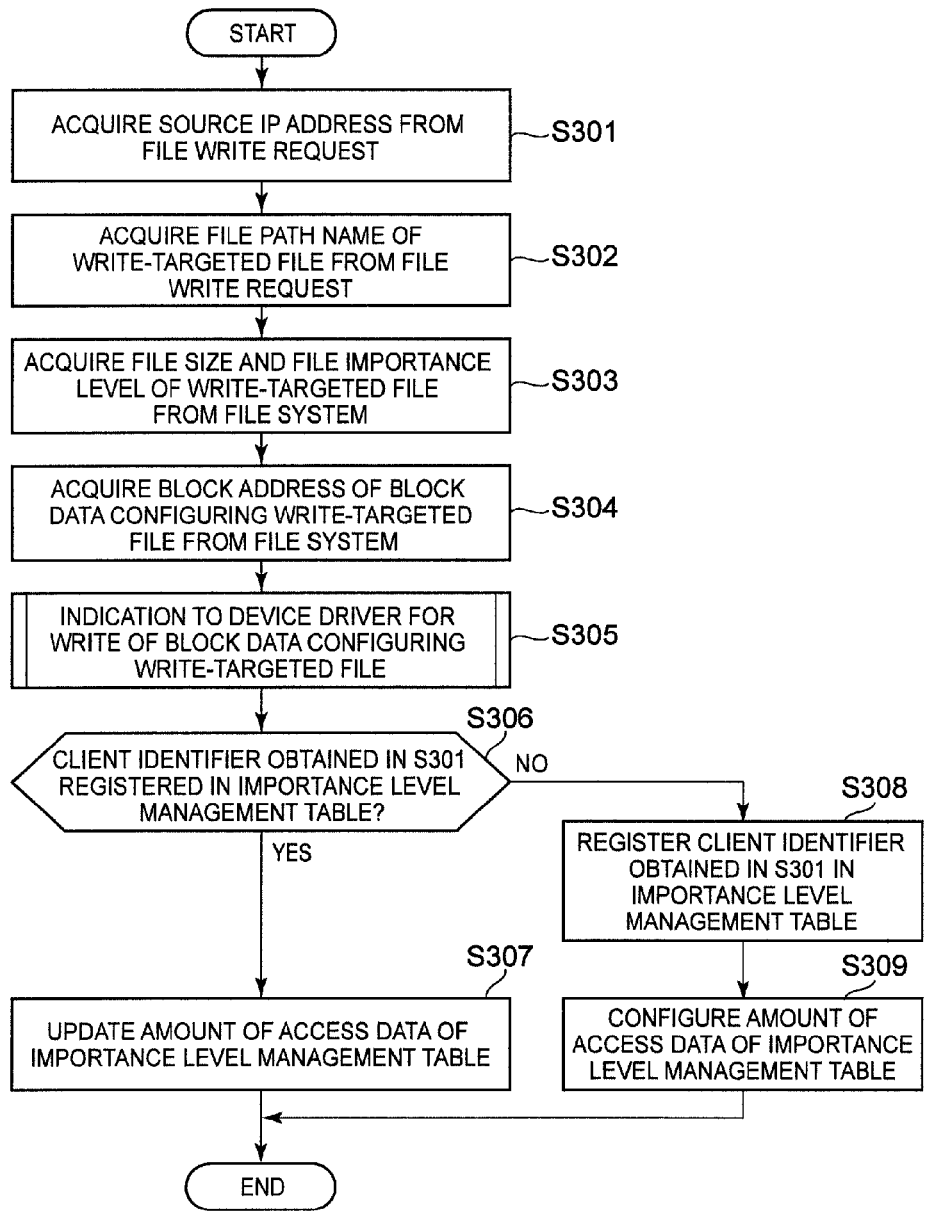
FIG. 14 is a flowchart of processing carried out by a write request receive process program.

FIG. 14 is a flowchart of the processing carried out by the write request receive process program 262.

The processing of FIG. 14 is carried out when a file write request received from the client 1 is received from the TCP/IP processor.

First, the write request receive process program 262 acquires the source IP address from the file write request received from the TCP/IP processor (S301). The MAC address realized by converting the source IP address acquired in S301 constitutes the client identifier of the client 1 that sent the file write request.

Next, the write request receive process program 262 acquires information (the file path name) for specifying the write-targeted file 22 from the file write request received from the TCP/IP processor (S302).

Next, the write request receive process program 262 acquires from the file system the file size of the write targeted file 22 and the file importance level 221 set in the write-targeted file 22 (S303).

Next, the write request receive process program 262 acquires from the file system the respective block addresses of the block data 7 configuring the write-targeted file 22 (S304).

Thereafter, the write request receive process program 262 causes the device driver 272 to write block data 7 configuring the write-targeted file 22 to the LU 32 of the storage system 3 (S305). The write request receive process program 262 can notify the device driver 272 at this time of the client identifier obtained in S301 and the file size acquired in S303. In S305, the path sorting process program 273 of the device driver 272 sends the block write request to the storage system 3, and writes the block data 7 configuring the write-targeted file 22 to the LU 32.

Thereafter, the write request receive process program 262 determines whether or not the client identifier obtained in S301 has been registered in the importance level management table 82 (S306).

When the client identifier obtained in S301 has been registered in the importance level management table 82 (S306: YES), the write request receive process program 262 adds the file size acquired in S303 to the amount of access data corresponding to the client identifier obtained in S301 and the file importance level 221 acquired in S303 (S307).

Conversely, when the client identifier obtained in S301 has not been registered in the importance level management table 82 (S306: NO), the write request receive process program 262 registers the client identifier obtained in S301 in the importance level management table 82 (S308).

Thereafter, the write request receive process program 262 sets the file size acquired in S303 in the amount of access data corresponding to the client identifier obtained in S301 and the file importance level 221 acquired in S303 (S309).

Figure 15:
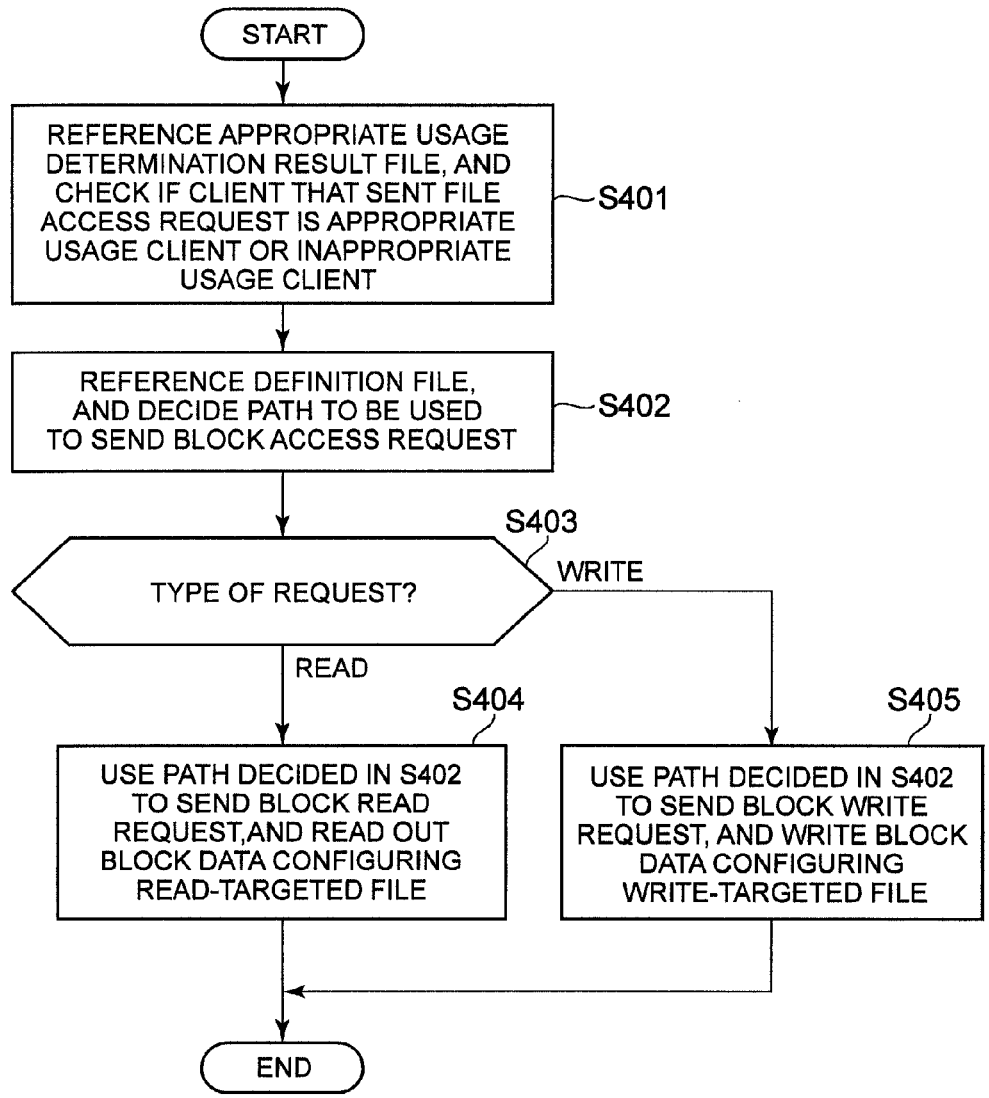
FIG. 15 is a flowchart of processing carried out by a path sorting process program.

FIG. 15 is a flowchart of the processing carried out by the path sorting process program 273.

The processing of FIG. 15 is carried out either when a block data read indication is received from the read request receive process program 261 in the processing of S205 of FIG. 13, or when a block data write indication is received from the write request receive process program 262 in S305 of FIG. 14.

First, the path sorting process program 273 references the appropriate usage determination result file 83, and checks if the client 1 specified by the client identifier notified from either the read request received process program 261 or the write request receive process program 262 (that is, the client 1 that sent the file access request) has been determined to be an appropriate usage client or has been determined to be an inappropriate usage client (S401).

Next, the path sorting process program 273 references the definition file 84, and decides the path to be used to send the block access request (S402). For example, when a definition file 84 like that shown in FIG. 9 is referenced, if the result checked in S401 is that the client 1, which sent the file access request, has been determined to be an inappropriate usage client, the path sorting process program 273 decides on "PATH-006" as the path to be used to send the block access request. Conversely, if the client 1, which sent the file access request, has been determined to be an appropriate usage client, the path sorting process program 273 decides the path to be used to send the block access request by taking into account the file size (the file size of the access-targeted file 22) notified from either the read request receive process program 261 or the write request receive process program 262. That is, if the notified file size is 100 MB or larger, the path sorting process program 273 decides that any one or more of "PATH-001", "PATH-002" and "PATH-003" will be the path used to send the block access request. Conversely, if the notified file size is less than 100 MB, the path sorting process program 273 decides that "PATH-004" and/or "PATH-005" will be the path used to send the block access request.

Thereafter, the type of block access request to be sent to the storage system 3 is determined (S403). When the processing of FIG. 15 is being carried out based on an indication of the read request receive process program 261, the block access request to be sent to the storage system 3 is a block read request. Conversely, when the processing of FIG. 15 is being carried out based on an indication of the write request receive process program 262, the block access request to be sent to the storage system 3 is a block write request.

When the block access request is a block read request (S403: READ), the path sorting process program 273 sends a block read request to the storage system 3 using the path decided in S402, and reads out the block data 7 configuring the read-targeted file 22 (S404).

Conversely, when the block access request is a block write request (S403: WRITE), the path sorting process program 273 sends a block write request to the storage system 3 using the path decided in S402, and writes the block data 7 configuring the write-targeted file 22 to the LU 32 (S405).

Figure 16:
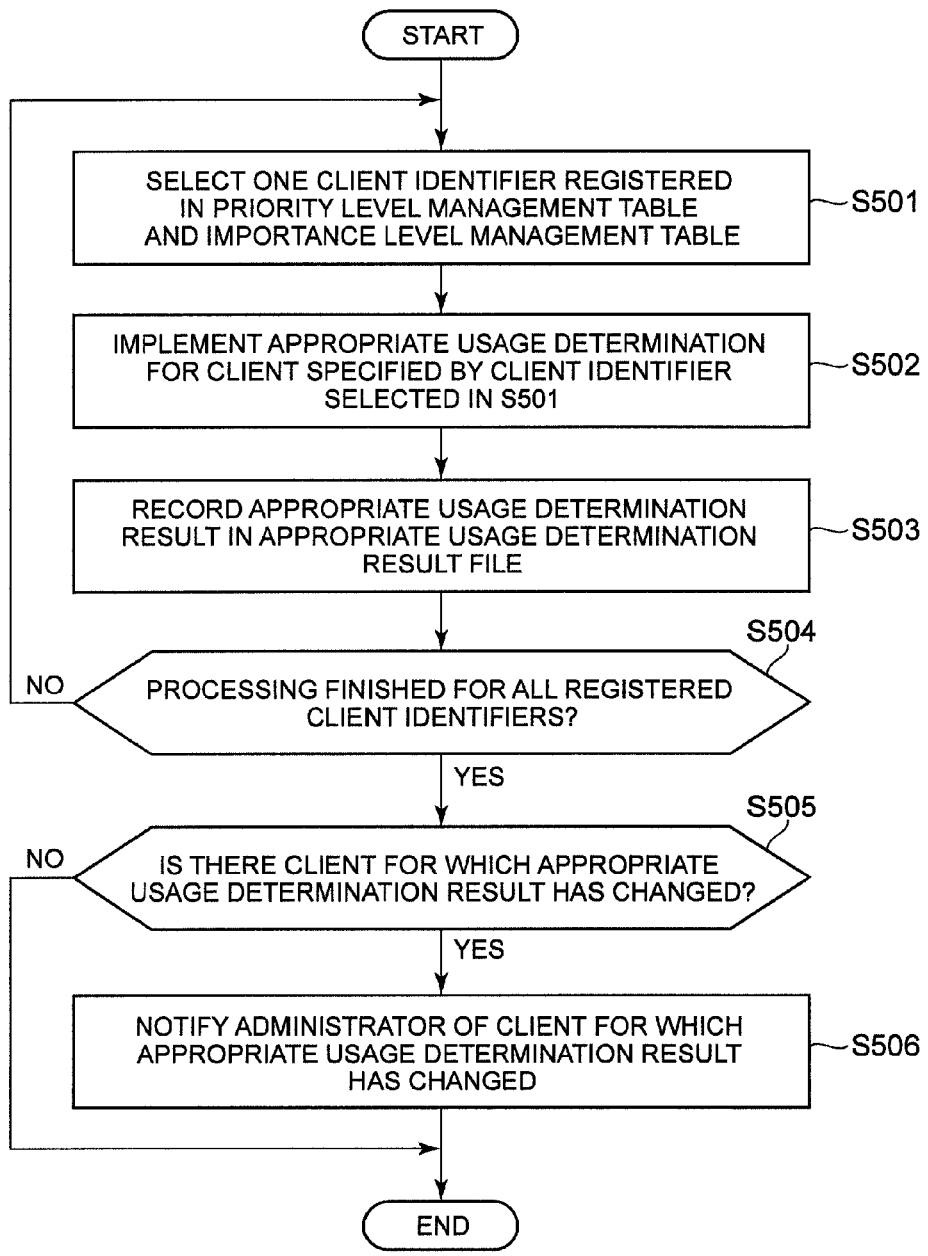
FIG. 16 is a flowchart of processing carried out by a appropriate usage determination process program.

FIG. 16 is a flowchart of the processing carried out by the appropriate usage determination process program 263.

As mentioned hereinabove, the processing of FIG. 16 is carried out either regularly (for example, once a day or once every half a day) or irregularly.

First, the appropriate usage determination process program 263 selects one client identifier, which is registered in the priority level management table 81, and which is also registered in the importance level management table 82 (S501).

Next, the appropriate usage determination process program 263 carries out an appropriate usage determination for the client 1 specified by the client identifier selected in S501 (S502). The appropriate usage determination method is as described hereinabove.

Thereafter, the appropriate usage determination process program 263 records the result of S502 in the appropriate usage determination result file 83 (S503).

The appropriate usage determination process program 263 repeatedly carries out the processing of S501 through S503 for the clients 1 specified by all the client identifiers registered in both the priority level management table 81 and the importance level management table 82 (S504).

Thereafter, the appropriate usage determination process program 263 determines whether or not there is a client 1 for which the appropriate usage determination result has changed as a result of the appropriate usage determination process of S502 having been carried out (S505).

When there is a client 1 for which the appropriate usage determination result has changed (S505: YES), the appropriate usage determination process program 263 displays a screen, which notifies the change in the appropriate usage determination result, thereby notifying the contents of the change to the administrator (S506).

Conversely, when there is no client 1 for which the appropriate usage determination result has changed (S505: NO), the appropriate usage determination process program 263 ends the processing of FIG. 16 without carrying out the processing of S506.

FIG. 17 is a diagram showing an example of a screen 10 for notifying the change in the appropriate usage determination result.

This screen 10, for example, comprises "<Appropriate Usage Client>" tag 101, and "<Inappropriate Usage Client>" tag 102. A list of client identifiers of clients 1, which have been determined to be appropriate usage clients, is displayed in "<Appropriate Usage Client>" tag 101. Conversely, a list of client identifiers of clients 1, which have been determined to be inappropriate usage clients, is displayed in "<Inappropriate Usage Client>" tag 102. Further, for example, check boxes 103 for showing that the appropriate usage determination result has changed are displayed on the screen 10 for the respective client identifiers being displayed. A check mark is displayed in a check box 103 corresponding to the client identifier of a client 1 for which the appropriate usage determination result has changed.

The numerous embodiments of the present invention described hereinabove are examples for explaining the present invention, and do not purport to limit the scope of the present invention to these embodiments. The present invention can be put into practice in a variety of other modes without departing from the gist thereof.

For example, the NAS 2 and storage system 3 can be integrated. More specifically, for example, the NAS 2 can be incorporated into the storage system 3 as a client 1 interface circuit board.

What is claimed is:

1. A storage controller which is connected to a plurality of clients for sending a plurality of packets, each of the packets including priority level information designated by the respective clients requesting file access, and a storage device for storing block data configuring a file, and which converts a file access request which is configured from one or more packets sent from the respective clients, to a block access request and sends the block access request to the storage device according to the priority level information included in the one or more packets, the storage controller comprising:

a processor controlling the storage controller; and
memory storing priority level management information and importance level management information, the priority level management information manages an amount of first data sent by a first client with packets including a first type of priority level and an amount of second data sent by the first client with packets including a second type of priority level which is different from the first type of priority level, the importance level management information manages a total amount of third data sent by the first client as packets requesting file access to a first file managed as a file of a first type of importance level and a total amount of fourth data sent by the first client as packets requesting file access to a second file managed as a file of a second type of importance level which is different from the first type of importance level, the first type of importance level corresponding to the first type of priority level and predetermined by an administrator for the first file, the second type of importance level corresponding to the second type of priority level and predetermined by an administrator for the second file,
wherein the processor is configured to:
update, upon receiving a packet sent by the first client including the first type of priority level, the amount of the first data managed in the priority level management information, on the basis of an amount of data included in the received packet;

update, upon receiving a packet sent by the first client configuring file access to the first file, the total amount of the third data managed in the importance level management information on the basis of an amount of data included in the received packet;

determine whether the first client is appropriate or inappropriate based on a comparison of the amount of the first data and the total amount of the third data;

use, if the first client is appropriate according to the determination, a first set of a plurality of paths to send the block access requests, corresponding to the packets sent from the first client, to the storage device; and use, if the first client is inappropriate according to the determination, a second set of the plurality of paths to send the block access requests to the storage device.

2. The storage controller according to claim 1, wherein the processor is further configured to notify the first client, upon determining that the first client is inappropriate, of an appropriate packet priority level that differs from a packet priority level set in the packet received from the first client.

3. The storage controller according to claim 2, wherein the file access request is a file read request specifying a read-targeted file;

the first client which has been determined to be inappropriate is a target client of the read-targeted file; and the processor notifies the appropriate packet priority level by setting, in the packet to be sent to the target client in response to the file read request, a packet priority level that is lower than the packet priority level set in the packets configuring the file read request, and sending the packet for which the lower packet priority level has been set to the target client.

4. The storage controller according to claim 1, wherein, if the result of the current determination differs from the result of the previous determination for a certain client of the plurality of clients, the client determination module notifies the computer used by an administrator and/or the certain client of the fact that the result of the current determination differs from the result of the previous determination for the certain client.

5. The storage controller of claim 1, wherein a plurality of first packets received from the first client form the file access request, and the same type of priority level is set in the plurality of the first packets.

6. The storage controller of claim 1, wherein the processor determines that the first client is inappropriate if a difference between the amount of the first data and the total amount of the third data is greater than a threshold value.

7. The storage controller of claim 1, wherein a number of the first set of the plurality of paths is greater than a number of the second set of the plurality of paths.

8. A storage system comprising:

a storage device for storing block data configuring a file; and a storage controller which is connected to a plurality of clients for sending a plurality of packets, each of the packets including priority level information designated by the respective clients requesting file access, and which converts a file access request which is configured from one or more packets sent from the respective clients, to a block access request and sends the block access request to the storage device according to the priority level information included in the one or more packets, the storage controller comprising:

a processor controlling the storage controller; and memory storing priority level management information and importance level management information, the priority level management information manages an amount of first data sent by a first client with packets including a first type of priority level and an amount of second data sent by the first client with packets including a second type of priority level which is different from the first type of priority level, the importance level management information manages a total amount of third data sent by the first client as packets requesting file access to a first file managed as a file of a first type of importance level and a total amount of fourth data sent by the first client as packets requesting file access to a second file managed as a file of a second type of importance level which is different from the first type of importance level, the first type of importance level corresponding to the first type of priority level and predetermined by an administrator for the first file, the second type of importance level corresponding to the second type of priority level and predetermined by an administrator for the second file, wherein the processor is configured to:

update, upon receiving a packet sent by the first client including the first type of priority level, the amount of the first data managed in the priority level management information, on the basis of an amount of data included in the received packet;

update, upon receiving a packet sent by the first client configuring file access to the first file, the total amount of the third data managed in the importance level management information on the basis of an amount of data included in the received packet;

determine whether the first client is appropriate or inappropriate based on a comparison of the amount of the first data and the total amount of the third data;

use, if the first client is appropriate according to the determination, a first set of a plurality of paths to send the block access requests, corresponding to the packets sent from the first client, to the storage device; and use, if the first client is inappropriate according to the determination, a second set of the plurality of paths to send the block access requests to the storage device.

9. A client determination method executed by a storage controller which is connected to a plurality of clients for sending a plurality of packets, each of the packets including priority level information designated by the respective clients requesting file access, and a storage device for storing block data configuring a file, and which storage controller converts a file access request which is configured from one or more packets sent from the respective clients to a block access request and sends the block access request to the storage device according to the priority level information included in the one or more packets, the client determination method comprising:

storing, using a processor, priority level management information and importance level management information, the priority level management information managing an amount of first data sent by a first client with packets including a first type of priority level and an amount of second data sent by the first client with packets including a second type of priority level which is different from the first type of priority level, the importance level management information managing a total amount of third data sent by the first client as packets requesting file access to a first file managed as a file of a first type of importance level and a total amount of fourth data sent by the first client as packets requesting file access to a second file managed as a file of a second type of importance level which is different from the first type of importance level, the first type of importance level corresponding to the first type of priority level and predetermined by an administrator for the first file, the second type of importance level corresponding to the second type of priority level and predetermined by an administrator for the second file, updating, upon receiving a packet sent by the first client including the first type of priority level, the amount of the first data managed in the priority level management information, on the basis of an amount of data included in the received packet;

updating, upon receiving a packet sent by the first client configuring file access to the first file, the total amount of the third data managed in the importance level management information on the basis of an amount of data included in the received packet;

determining whether the first client is appropriate or inappropriate based on a comparison of the amount of the first data and the total amount of the third data;

using, if the first client is appropriate according to the determination, a first set of a plurality of paths to send the block access requests, corresponding to the packets sent from the first client, to the storage device; and using, if the first client is inappropriate according to the determination, a second set of the plurality of paths to send the block access requests to the storage device.

10. A non-transitory computer readable storage medium storing a computer program for executing functions of a client determination method, the client determination method executed by a storage controller which is connected to a plurality of clients for sending a plurality of packets, each of the packets including priority level information designated by the respective clients requesting file access, and a storage device for storing block data configuring a file, and which storage controller converts a file access request which is configured from one or more packets sent from the respective clients to a block access request and sends the block access request to the storage device according to the priority level information included in the one or more packets, the functions of the client determination method comprising:

storing, priority level management information and importance level management information, the priority level management information managing an amount of first data sent by a first client with packets including a first type of priority level and an amount of second data sent by the first client with packets including a second type of priority level which is different from the first type of priority level, the importance level management information managing a total amount of third data sent by the first client as packets requesting file access to a first file managed as a file of a first type of importance level and a total amount of fourth data sent by the first client as packets requesting file access to a second file managed as a file of a second type of importance level which is different from the first type of importance level, the first type of importance level corresponding to the first type of priority level and predetermined by an administrator for the first file the second type of importance level corresponding to the second type of priority level and predetermined by an administrator for the second file, updating, upon receiving a packet sent by the first client including the first type of priority level, the amount of the first data managed in the priority level management information, on the basis of an amount of data included in the received packet;

updating, upon receiving a packet sent by the first client configuring file access to the first file, the total amount of the third data managed in the importance level management information on the basis of an amount of data included in the received packet;

determining whether the first client is appropriate or inappropriate based on a comparison of the amount of the first data and the total amount of the third data;

using, if the first client is appropriate according to the determination, a first set of a plurality of paths to send the block access requests, corresponding to the packets sent from the first client, to the storage device; and using, if the first client is inappropriate according to the determination, a second set of the plurality of paths to send the block access requests to the storage device.

* * * * *